(12) United States Patent
Soikkeli

(10) Patent No.: US 12,509,217 B2
(45) Date of Patent: Dec. 30, 2025

(54) DIRECT THRUST CONTROL METHOD FOR AIRCRAFT THRUSTER

(71) Applicant: Pipistrel d.o.o., Ajdovscina (SI)

(72) Inventor: Johannes Soikkeli, Vrhnika (SI)

(73) Assignee: Pipistrel d.o.o., Ajdovscina (SI)

( * ) Notice: Subject to any disclaimer, the term of this patent is extended or adjusted under 35 U.S.C. 154(b) by 28 days.

(21) Appl. No.: 18/811,485

(22) Filed: Aug. 21, 2024

(65) Prior Publication Data

US 2025/0083799 A1 Mar. 13, 2025

Related U.S. Application Data

(60) Provisional application No. 63/582,505, filed on Sep. 13, 2023.

(51) Int. Cl.
*B64C 11/30* (2006.01)
*B64D 31/06* (2006.01)

(52) U.S. Cl.
CPC ............ *B64C 11/305* (2013.01); *B64D 31/06* (2013.01)

(58) Field of Classification Search
CPC ........ B64C 11/305; B64C 11/44; B64D 31/06
See application file for complete search history.

(56) References Cited

U.S. PATENT DOCUMENTS

| | | | |
|---|---|---|---|
| 2018/0237125 A1* | 8/2018 | Lisio ........................ | B64C 11/30 |
| 2019/0047715 A1* | 2/2019 | Hedrick ................. | B64D 31/10 |
| 2023/0056909 A1* | 2/2023 | Gusman ................. | B64D 31/06 |
| 2023/0122557 A1* | 4/2023 | Grzedzinski ......... | B64D 27/355 244/53 R |

OTHER PUBLICATIONS

Extended European Search Report issued Dec. 11, 2024 in European Patent Application No. 24197530.9, 11 pages.

* cited by examiner

*Primary Examiner* — Sizo B Vilakazi
(74) *Attorney, Agent, or Firm* — Avek IP, LLC

(57) ABSTRACT

A method and control system for controlling the thrust of an aircraft. A thrust request is input into a controller and the controller determines throttle, governor, and RPM setpoints to meet the input thrust request. The controller can determine minimum and maximum available thrust limits of the engine and can modify any of the setpoints if any setpoint violates the available thrust limit.

20 Claims, 4 Drawing Sheets

DIRECT THRUST CONTROL METHOD FOR AIRCRAFT THRUSTER

CROSS-REFERENCE TO RELATED APPLICATIONS

This application claims the benefit of U.S. Provisional Patent Application No. 63/582,505, filed on Sep. 13, 2023, the entire contents thereof are herein incorporated by reference.

BACKGROUND OF THE INVENTION

1. Field

The disclosed embodiments relate generally to the field of thrust control on aircraft. More specifically, the disclosed embodiments relate to the process of controlling and simplifying aircraft thrust using a control system.

2. Description of the Related Art

It is known to control the thrust on an aircraft. It is also known to have a throttle lever to control power output of an aircraft engine and a governor lever to control a blade angle of an aircraft propeller.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a method for providing thrust control to an internal combustion engine, the method including: receiving a thrust request; determining at least one of a throttle setpoint, a governor setpoint, or a RPM setpoint based on the thrust request; determining whether the thrust request violates an available thrust limit; and if the thrust request does not violate the available thrust limit, transmitting at least one of the throttle setpoint, the governor setpoint, or the RPM setpoint to an engine, or if the thrust request violates the available thrust limit, determining at least one of a modified throttle setpoint, a modified governor setpoint, or a modified RPM setpoint, and transmitting the at least one of the modified throttle setpoint, the modified governor setpoint, or the modified RPM setpoint to the engine.

In some embodiments, the techniques described herein relate to a method wherein the available thrust limit is a maximum thrust limit.

In some embodiments, the techniques described herein relate to a method wherein the available thrust limit is a minimum thrust limit.

In some embodiments, the techniques described herein relate to a method including providing an engine and propeller performance look up table to serve as an engine performance data array.

In some embodiments, the techniques described herein relate to a method including adjusting a blade angle of a propeller via a governor lever to meet the governor setpoint or the modified governor setpoint.

In some embodiments, the techniques described herein relate to a method including adjusting a power output of the engine via a throttle lever to meet the throttle setpoint or the modified throttle setpoint.

In some embodiments, the techniques described herein relate to a method including receiving a mode request and using the mode request to determine at least one of: (i) the modified throttle setpoint, (ii) the modified governor setpoint, and (iii) the modified RPM setpoint.

In some embodiments, the techniques described herein relate to a method wherein the mode request is a selection between a first mode corresponding to a first RPM, a second mode corresponding to a second RPM, or a third mode corresponding to a third RPM.

In some embodiments, the techniques described herein relate to a method including determining at least one of: (i) the modified throttle setpoint, (ii) the modified governor setpoint, and (iii) the modified RPM setpoint via an airspeed reading and an altitude reading.

In some embodiments, the techniques described herein relate to a method including receiving the thrust request from at least one of a pilot or an autopilot.

In some embodiments, the techniques described herein relate to a system for providing thrust control to an engine, including: a horizontal thrust unit (HTU) controller configured to control an amount of thrust produced by the engine, wherein the HTU controller is configured to receive a thrust request for an amount of desired thrust from a flight control computer, and the HTU controller determines whether the thrust request violates an available thrust limit; a throttle lever operatively coupled to the HTU controller; and a governor lever operatively coupled to the HTU controller, wherein the HTU controller adjusts the throttle lever and the governor lever based upon the thrust request when the thrust request does not violate the available thrust limit.

In some embodiments, the techniques described herein relate to a system wherein the HTU controller uses a throttle setpoint for controlling the throttle lever, a governor setpoint for controlling the governor lever, and an RPM setpoint for controlling a propeller speed to meet the thrust request.

In some embodiments, the techniques described herein relate to a system wherein the available thrust limit includes a maximum amount of thrust the engine can produce.

In some embodiments, the techniques described herein relate to a system wherein the available thrust limit includes a minimum amount of thrust the engine can produce.

In some embodiments, the techniques described herein relate to a system wherein when the throttle setpoint, the governor setpoint, and the RPM setpoint are within the available thrust limit, operation of the engine occurs at an optimal efficiency.

In some embodiments, the techniques described herein relate to a system wherein when the throttle setpoint, the governor setpoint, and the RPM setpoint are not within the available thrust limit, a modified throttle setpoint, a modified governor setpoint, and a modified RPM setpoint are used by the HTU controller to meet the thrust request.

In some embodiments, the techniques described herein relate to a system wherein when the modified throttle setpoint, the modified governor setpoint, and the modified RPM setpoint are settings of the throttle lever and governor lever, the engine does not operate at an optimal efficiency.

In some embodiments, the techniques described herein relate to a method for providing thrust control to an internal combustion engine, the method including: receiving information about an aircraft state of flight; determining a mode request based on the aircraft state of flight; determining an available thrust limit and at least one of a throttle setpoint, a governor setpoint, or a RPM setpoint based on the mode request; determining whether any of the throttle setpoint, governor setpoint, or RPM setpoint violate the available thrust limit; when any setpoint does not violate the available thrust limit, transmitting at least one of the throttle setpoint, the governor setpoint, or the RPM setpoint to an engine; when any setpoint violates the available thrust limit, changing the mode request corresponding to a different available thrust limit such that the throttle setpoint, governor setpoint, and RPM setpoint do not violate the different available thrust limit; and transmitting the at least one of the throttle setpoint, governor setpoint, RPM setpoint to the engine.

In some embodiments, the techniques described herein relate to a method including determining the mode request based upon a thrust request.

In some embodiments, the techniques described herein relate to a method wherein the mode request includes a selection between a first mode having a first available thrust limit, a second mode having a second available thrust limit, and a third mode having a third available thrust limit.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
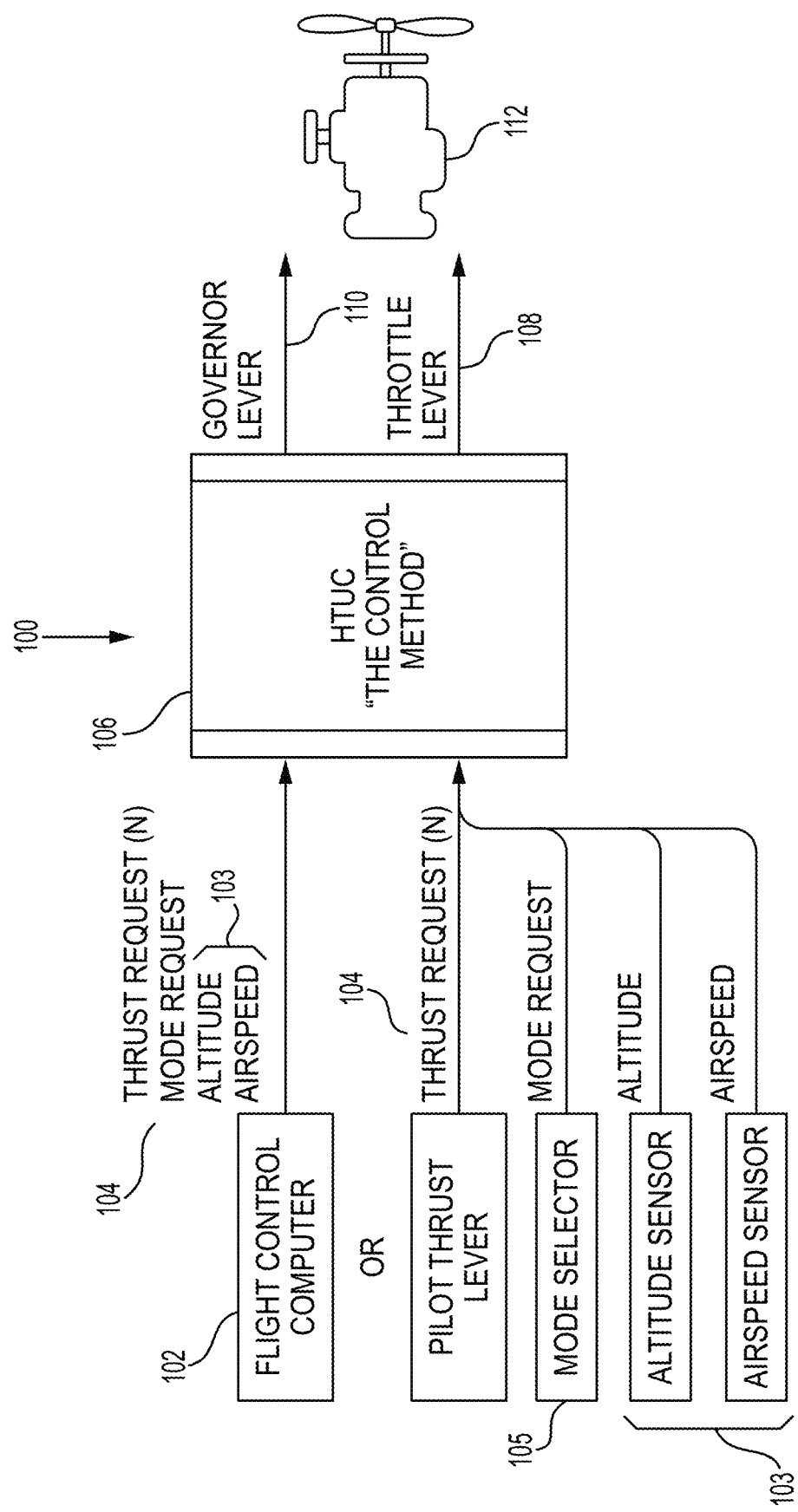
FIG. 1 is a high level process flow of a method for direct thrust control.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a control system and method to simplify thrust control on an aircraft. Currently, a percentage of available aircraft engine power is used as a unit of measure when a pilot or flight control system desires to change the amount of thrust on an aircraft in flight. This is disadvantageous because different engines produce different amounts of thrust which makes different thrust levels different percentages of aircraft power. This way of measuring an aircraft's thrust makes the control system on an aircraft incompatible with different engines. Current systems also involve a complex method for controlling the thrust on an aircraft. Many variables, including propeller speed, fuel mixture control, propeller RPM control, and propeller blade angle may be accounted for when controlling the thrust on an aircraft. Additionally, some or all of these variables discussed above may be set to a predetermined level to avoid increasing a pilot's workload. This results in the engine running at a suboptimal level and having less efficiency than if these variables were able to be controlled based on an aircraft's current flight conditions. Automatic flight control systems require information about the thrust (e.g., the force in Newtons) generated by the engine and can make controlling the engine in terms of thrust intuitive. A control system compatible which different engines is needed to reduce the complexity of controlling the thrust on an aircraft so that optimal engine performance may be achieved. Additionally, a system which communicates the thrust being requested as a percentage of the overall thrust available by an engine can increase a pilot's knowledge of the actual aircraft performance limits.

The disclosed embodiments include a method and a dedicated controller for substantially controlling aircraft thrust and advantageously, can provide thrust control based upon current flight conditions of an aircraft. The single lever control system in embodiments communicates and operates using thrust units and provides optimum engine power and simplifies controlling an aircraft's thrust, which can substantially decrease the workload of the pilot. In embodiments, a controller can reference look up tables containing tabulated aircraft engine and propeller performance data to substantially control the thrust produced by an aircraft. In this way, the thrust of an aircraft can be adjusted in an open loop system. An open loop system requires no feedback signal from the engine to the flight controller computer and allows for a change in thrust to be obtained using the adjustment of aircraft flight systems to provide the desired amount of thrust.

FIG. 1 shows a high level process flow of a method 100 performed by a controller which, in embodiments, is horizontal thrust unit controller 106. The horizontal thrust unit controller 106 communicates with flight control computer 102 which communicates with aircraft components to substantially control the thrust of an aircraft. Flight control computer 102 can transmit a thrust request 104 to the control method, which can be performed by horizontal thrust unit controller 106. In a preferred embodiment, the horizontal thrust unit controller 106 is a separate control system integrated into the aircraft which functions in conjunction with the flight control computer 102. In other embodiments, the horizontal thrust unit controller 106 may be integrated into the flight control computer 102.

The thrust request 104 in one instance may be determined based upon a pilot input of increasing or decreasing the amount of thrust to change the aircraft altitude or increase or decrease aircraft airspeed. In another instance, the thrust request 104 may be determined by the flight control computer 102. The flight control computer 102 may have input information such as the aircraft mode request 105 and the airspeed and altitude 103 in order to calculate the thrust request 104 to transmit to the horizontal thrust unit controller 106. Alternatively, inputs may be transmitted to the horizontal thrust unit controller 106 directly. The inputs may be measured using a pilot thrust lever, a mode selector, an altitude sensor, or an airspeed sensor. The flight control computer 102 is capable of receiving a pilot input or function autonomously to respond to aircraft state changes, and is able to communicate with a controller to control an increase or decrease in thrust to reach a desired state or position. The flight control computer 102 and the horizontal thrust unit controller 106 operate using a single unit of measure which substantially allows the horizontal thrust unit controller 106 to provide direct thrust control.

The horizontal thrust unit controller 106 is configured to determine any or all of a RPM setpoint 210, a throttle setpoint 212, and governor setpoint 218 (see FIG. 2) based on the thrust request 104, and can control a throttle lever 108 and/or a governor lever 110 in embodiments, to achieve the thrust requested by the flight control computer 102. The throttle lever 108 and the governor lever 110 may be adjusted to increase or decrease the aircraft thrust.

In embodiments, the governor lever 110 may increase or decrease the aircraft propeller blade angle thus increasing or decreasing the amount of drag experienced and thrust produced by the aircraft. If the governor lever 110 is adjusted in one direction the blade angle of the aircraft propeller will increase and if the governor lever 110 is adjusted in an opposite direction the blade angle of the aircraft propeller will decrease. The throttle lever 108 may be adjusted to increase or decrease the power output of the aircraft engine. If the throttle lever 108 is adjusted in one direction the power output of the aircraft engine will increase and if throttle lever 108 is adjusted in an opposite direction the power output of the aircraft engine will decrease. The horizontal thrust unit controller 106 controls the throttle lever 108 and/or the governor lever 110 to provide a desired amount of thrust and allows the aircraft and its internal combustion engine (ICE) 112 to operate optimally. For example, during takeoff, the thrust command may be set to its maximum value and the horizontal thrust unit controller 106 adjusts the throttle lever 108 and the governor lever 110 to create the maximum amount of thrust, and executes commands to adjust the throttle lever 108 and/or the governor lever 110 accordingly. In embodiments, during a take-off, the horizontal thrust unit controller 106 may be set to a boost mode to adjust the propeller RPM accordingly. To maintain a cruising altitude, the horizontal thrust unit controller 106, in embodiments, may be set to a cruise mode which may adjust the propeller RPM, the throttle lever 108, and/or the governor lever 110 to generate optimal efficiency and endurance. Within the method 100, communitative connections made between components may be made using a wired or wireless connection and should not be considered limiting within the scope of the method 100 in embodiments.

Figure 2:
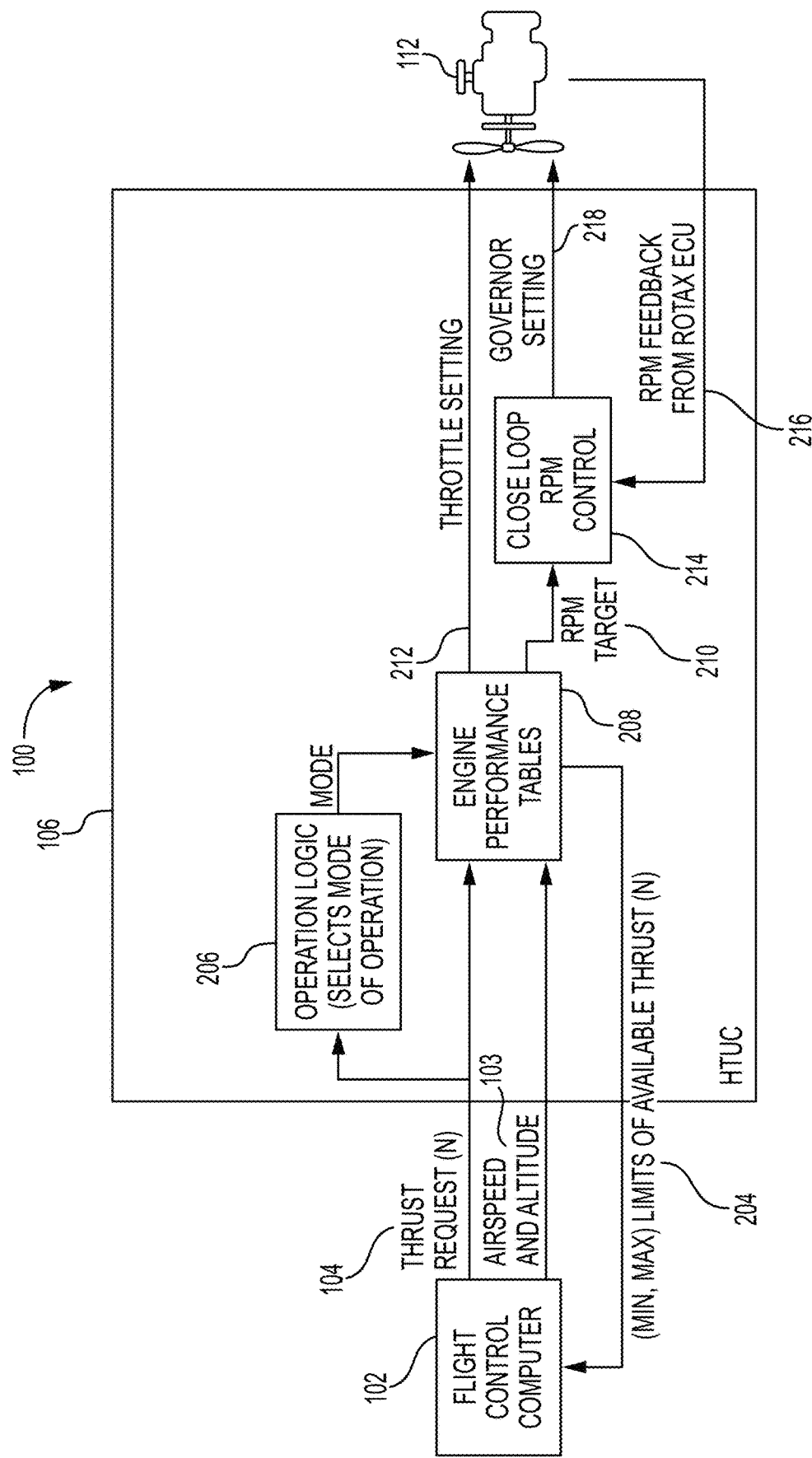
FIG. 2 is a detailed process flow of a method for direct thrust control.

FIG. 2 shows a more detailed process flow of the method 100 used by horizontal thrust unit controller 106. The method 100 begins with the flight control computer 102 relaying a thrust request 104 and information, which may be the current aircraft speed and altitude 103 to the horizontal thrust unit controller 106. The thrust request 104 may be transmitted in a unit of measure such as a Newton or other thrust measuring unit which allows the thrust to be communicated as a percentage of the total available thrust of the aircraft engine. The flight control computer 102 may include wired or wireless connections to sensors or other known aircraft diagnostic detection instruments to obtain the thrust request 104 and the aircraft speed and altitude 103. The thrust request 104 may optionally be input by the pilot or an autopilot, or can be determined based upon the mode request 105. For example, if the pilot wishes to increase altitude, the value of the thrust request 104 will be increased. The thrust request 104 then proceeds to an operation logic 206.

In some embodiments, the operation logic 206 may include numerous different modes of operation for the ICE 112 to operate. In a first mode, an idle mode, the ICE 112 is idling and the horizontal thrust unit controller 106 maintains an idle RPM. The horizontal thrust unit controller 106 may allow the ICE 112 to operate in an idle mode when the aircraft is on the ground. In a second mode, a continuous mode, the ICE 112 operates at a RPM to allow for the ICE 112 to operate at an optimal efficiency. In embodiments, an RPM range for the ICE 112 in the second mode may be approximately 5500 RPM. The horizontal thrust unit controller 106 may allow the ICE 112 to operate in the second mode when the aircraft is at a cruising altitude. In a third mode, a boost mode, the ICE 112 operates at a RPM which allows for the full thrust of the ICE 112. In embodiments, a RPM range for the ICE 112 in the third mode may be 5800 RPM. The horizontal thrust unit controller 106 may allow the ICE 112 to operate in the third mode when the aircraft is taking off or increasing altitude. For instance, if the flight control computer 102 is commanding the ICE 112 to operate at 5500 RPM in the second mode and an altitude increase is needed, the horizontal thrust unit controller 106 may adjust the RPM and switch to the third mode adjusting the RPM to 5800 RPM to increase altitude. In this way, the flight control computer 102 substantially only identifies a change from the second mode to the third mode. In some embodiments, operational modes may not be associated with a specified RPM and may include an RPM range corresponding to different thrust requests, in which case, the horizontal thrust unit controller 106 can determine a mode of operation and adjust the RPM within the RPM range of the selected mode. The horizontal thrust unit controller 106 is able to select a mode of operation to be used which is transferred to the engine performance tables 208. The horizontal thrust unit controller 106 uses the thrust request 104 and the aircraft speed and altitude 103 along with the operation logic 206 to find a corresponding governor position and RPM using the engine performance tables 208. The engine performance tables 208, in embodiments, may be in the form of a data array.

In other embodiments, the horizontal thrust unit controller 106 may use continuous RPM adjustment to respond to state changes of the aircraft. The state changes of the aircraft may include an idling state, a cruising state, or a takeoff state and numerous other states in which the RPM may be adjusted to allow the ICE 112 to meet a thrust request or perform optimally.

Engine performance tables 208 include combustion engine performance and propeller performance data and may be tabulated in a desired format to be interpreted by the horizontal thrust unit controller 106. In embodiments, the engine and propeller performance tables 208 data may be collected from an aircraft engine manufacturer or from in-flight testing. The engine performance tables 208 may include performance data of an aircraft with respect to a given thrust request 104 and the aircraft speed and altitude 103. The horizontal thrust unit controller 106 uses the engine performance tables 208 which take into consideration a current aircraft thrust request 104, the aircraft speed and altitude 103, and the operation logic 206 (i.e. mode request 105) to determine any or all of RPM setpoint 210, throttle setpoint 212, and governor setpoint 218 which the horizontal thrust unit controller 106 relays to the ICE 112 for operation and production of the thrust request 104. The horizontal thrust unit controller 106 uses the engine performance tables 208 to determine if any of the thrust request 104 and corresponding RPM setpoint 210, throttle setpoint 212, and governor setpoint 218 violate an available thrust limit 204. In embodiments, the available thrust limit 204 can be either the minimum or maximum available thrust limit 204 provided by the ICE 112. If any of the setpoints 210, 212, or 218 determined horizontal thrust unit controller 106 violate the available thrust limit 204, then the method 100 loops back to flight control computer 102 and the horizontal thrust unit controller 106 modifies any or all of the RPM setpoint 210, throttle setpoint 212, and governor setpoint 218 so that the setpoints do not violate the available thrust limit 204. Using the engine and propeller performance tables 208, and when given the airspeed and altitude 103, the thrust request 104, and mode request 105, the horizontal thrust unit controller 106 can compute the minimum or maximum available thrust limit 204 which may be transmitted back to the flight control computer 102. The horizontal thrust unit controller 106 does not allow the ICE 112 to operate above or below the minimum or maximum available thrust limit 204. The minimum or maximum available thrust limit 204 may change based upon the mode selected using the operation logic 206. For instance, if the ICE 112 is operating in the third mode, the maximum available thrust will be greater than if the ICE 112 is operating in the second mode or first mode.

Since the thrust request 104 is delivered to the engine performance tables 208 in units of Newtons or other thrust measuring unit, the horizontal thrust unit controller 106 may be compatible with numerous different engines. The horizontal thrust unit controller 106 uses the engine performance tables 208, substantially based upon the thrust request 104 and the aircraft speed and altitude 103, to locate a corresponding throttle setpoint 212 which meets the thrust request 104. The throttle setpoint 212 may meet the thrust request 104 by increasing or decreasing power to the ICE 112. For example, if the thrust request 104 is increased the engine performance tables 208 are used by the horizontal thrust unit controller 106 to determine the throttle setpoint 212 corresponding to the amount the throttle lever 108 is increased.

The horizontal thrust unit controller 106 may be communicatively connected to a motor or other device capable of moving a mechanical throttle mechanically or electrically to adjust the throttle lever 108 (FIG. 1) which adjusts the ICE 112 to output a desired amount of thrust, as indicated by the throttle setpoint 212.

The engine and propeller performance tables 208 are tabulated to use the thrust request 104, the aircraft speed and altitude 103, and the operation logic 206 (i.e. mode request 105) to allow the horizontal thrust unit controller 106 to locate a RPM setpoint 210.

RPM setpoint 210 is a RPM determined by the horizontal thrust unit controller 106 based upon the engine and propeller performance tables 208 which allows the ICE 112 to operate at optimal efficiency or produce the thrust requested by the flight control computer 102. For instance, when given the aircraft speed and altitude 103 and the thrust request 104, an optimal propeller RPM exists within the range of RPMs allowable by mode request 105 to meet the conditions of speed, altitude, and thrust. This RPM setpoint 210 is calculated by horizontal thrust unit controller 106 using the engine and propeller performance tables 208. Once the RPM setpoint 210 is calculated, the horizontal thrust unit controller is able to substantially control the ICE 112 RPM using the RPM controller 214.

The RPM controller 214 is a closed loop system controlling the governor setpoint 218 of the aircraft propeller and providing current aircraft RPM feedback to the horizontal thrust unit controller 106. The governor setpoint 218 is a setting able to control the amount the propeller blade is angled. The horizontal thrust unit controller 106 may serve a motor or other mechanical or electrical device, such as the governor lever 110 shown in FIG. 1, which is capable of adjusting the pitch of the propeller blade angle (e.g. mechanically or electrically) to the amount specified by the governor setpoint 218. The horizontal thrust unit controller 106 uses the RPM controller 214 to adjust the governor setpoint 218 which allows the ICE 112 to operate at its optimal efficiency or produce the desired amount of thrust. The governor setpoint 218 is continuously adjusted by the horizontal thrust unit controller 106 using the RPM feedback 216. The RPM feedback 216 is feedback from the ICE 112 which proceeds back to the RPM controller 214 so that the propeller blade angle may be continuously adjusted by the horizontal thrust unit controller 106. Adjustment of the propeller blade angle can be based on changing flight conditions for optimal efficiency and direct thrust control.

In one instance, if the thrust request 104 is increased, the horizontal thrust unit controller 106 uses the engine and propeller performance tables 208 to determine a corresponding amount of RPM increase and a throttle setpoint 212 for the propeller to operate at. This amount of RPM increase, in embodiments, is the RPM setpoint 210. The RPM setpoint 210 is transmitted to the RPM controller 214 so that the governor setpoint 218 may be adjusted by the horizontal thrust unit controller 106 to achieve a propeller blade angle most optimal for the thrust increase of the aircraft. The adjusted propeller blade angle is able to be fed back to the RPM controller 214 for continuous RPM adjustment.

Figure 3:
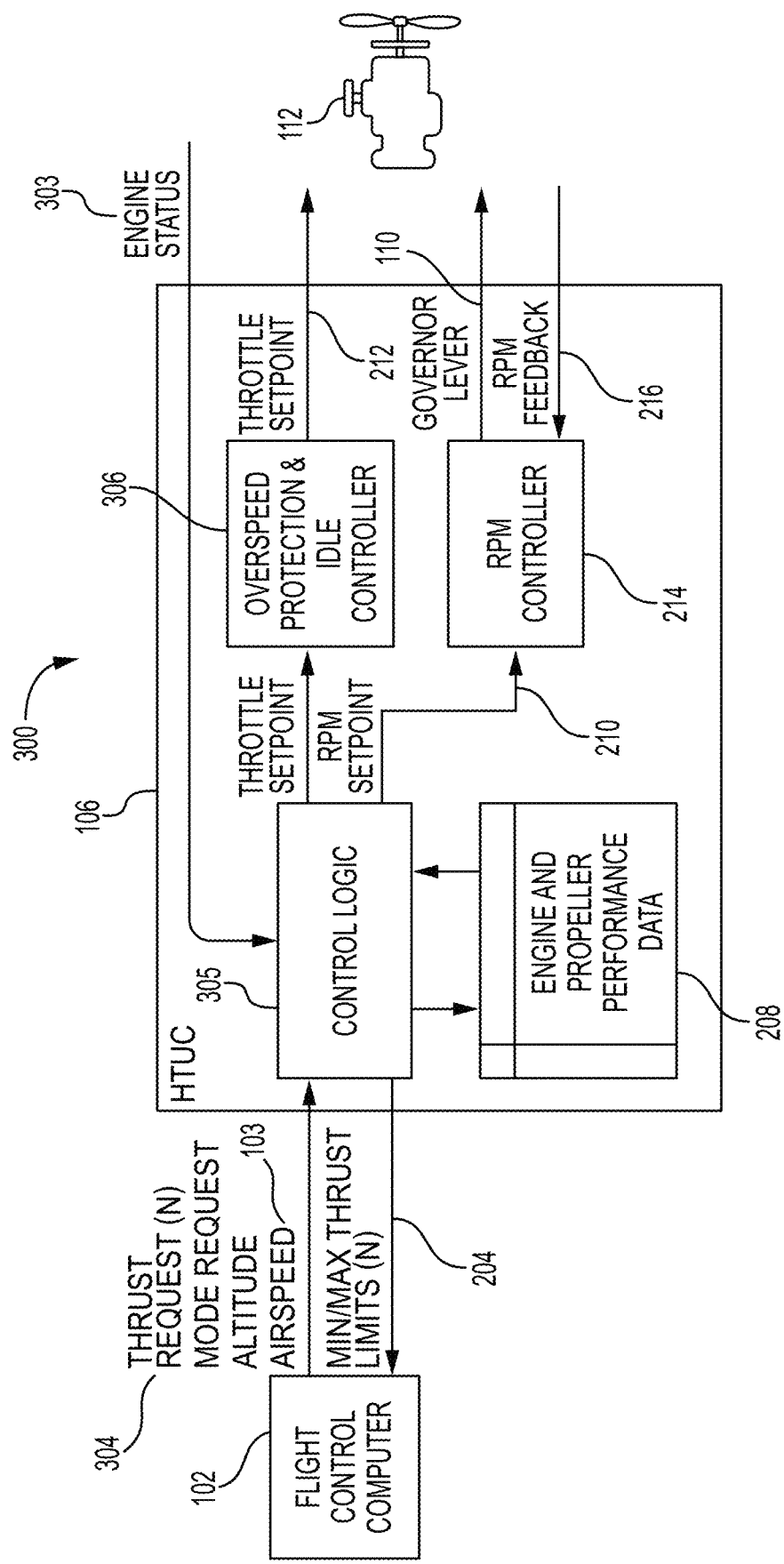
FIG. 3 is a high level process flow of a horizontal thrust unit controller for direct thrust control.

FIG. 3 shows a high level process flow 300 carried out by the horizontal thrust unit controller 106. The horizontal thrust unit controller 106 is configured to receive the aircraft flight data 304 which may include a thrust request 104, a mode request 105, and the airspeed and altitude 103 of the aircraft. The horizontal thrust unit controller 106 includes a control logic 305 which is configured to receive the flight data 304 and the engine status 303. The control logic 305 is configured to send the aircraft flight data 304 and the engine status 303 to the engine and propeller performance tables 208 and receive continuous feedback in real-time or near real-time so that the throttle setpoint 212, the RPM setpoint 210, and the minimum or maximum available thrust limit 204 may be calculated. The control logic 305 is configured to transmit the corresponding throttle setpoint 212 to an idle controller 306. The idle controller 306 allows the horizontal thrust unit controller 106 to control the throttle setpoint 212 to not violate the available thrust limit 204 determined by horizontal thrust unit controller 106, and possibly calculated using the engine and propeller performance tables 208. The idle controller 306 transmits the throttle setpoint 212 to the throttle lever 108 controlling the thrust of ICE 112. The control logic 305 is also configured to send the RPM setpoint 210 to the RPM controller 214. The RPM controller is configured to control the governor lever 110 and receive RPM feedback 216 to substantially control the RPM output by the ICE 112.

Figure 4:
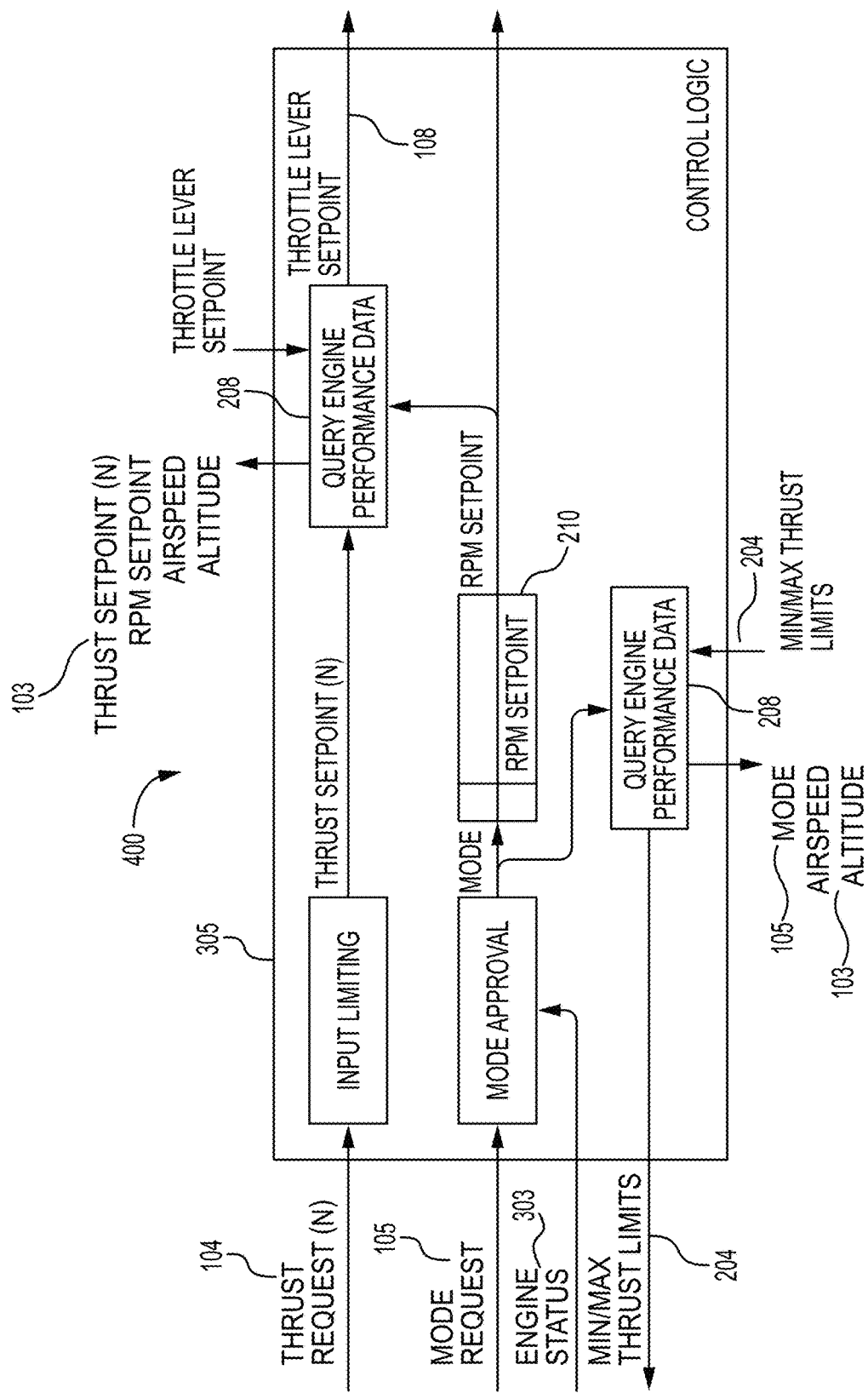
FIG. 4 is a high level process flow of a control logic for the horizontal thrust unit controller of FIG. 3.

FIG. 4 shows a high level process flow 400 carried out by the control logic 305 of the horizontal thrust unit controller 106. The control logic 305 is configured to receive the thrust request 104. A thrust request 104, in one instance, may be received by the horizontal thrust unit controller 106 when the aircraft is increasing altitude or during a takeoff state. The thrust request 104 may be transmitted from the flight control computer 102 or a by a pilot or autopilot. The horizontal thrust unit controller 106 uses the control logic 305 to transmit the thrust request 104 to the engine and propeller performance tables 208. The control logic 305 also receives a mode request 105. The mode request 105 may be transmitted from the flight control computer 102. The mode request 105 may be received by the control logic 305 when the aircraft is changing states. The state of the aircraft may be defined in embodiments when the aircraft is idling, taking off, cruising, or landing. The engine status 303, which in embodiments may be the status of the ICE 112, is also transmitted to the control logic 305. The control logic 305 of the horizontal thrust unit controller 106 is able to process the mode request 105 and determine the RPM setpoint 210. In embodiments, the RPM setpoint 210 can be based upon the mode request 105. For instance, the idle mode, the cruise mode, and the boost mode each require a specified RPM setpoint 210 as discussed in embodiments above, and allows the control logic 305 to calculate the RPM setpoint 210. The horizontal thrust unit controller 106 transmits the RPM setpoint 210 to engine and propeller performance tables 208 and to the ICE 112.

The horizontal thrust unit controller 106 uses the engine and propeller performance tables 208 to output the minimum or maximum available thrust limit 204 and the throttle setpoint 212. The throttle setpoint 212 may correspond directly to the RPM setpoint 210. The control logic 305 of the horizontal thrust unit controller 106 is configured to receive constant feedback of the throttle setpoint 212 and the minimum or maximum available thrust limit 204 such that the engine operates to produce the desired thrust and does not violate the minimum or maximum available thrust limit 204. In embodiments, the horizontal thrust unit controller 106 is able to operate at 100 Hz (i.e. monitor feedback a hundred times per second) to monitor the thrust request 104, airspeed, and altitude of the aircraft and uses the engine and propeller performance tables 208 to find any of all of the corresponding RPM setpoint 210, throttle setpoint 212, and governor setpoint 218.

The horizontal thrust unit controller 106 is able to substantially provide direct thrust control using the methods/process flows 100, 300, and 400. The horizontal thrust unit controller 106 uses the thrust request 104, mode request 105, and the aircraft speed and altitude 103 as inputs in order to find any of all of the RPM setpoint 210, throttle setpoint 212, and governor setpoint 218. In this way a one lever control is created for a pilot to operate the aircraft. The one lever control allows for a pilot to adjust the aircraft thrust and the horizontal thrust unit controller 106 adjusts the propeller speed (i.e RPM setpoint 210) and propeller blade angle (i.e. governor setpoint 218) for the aircraft to produce a requested amount of thrust for direct thrust control.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method for providing thrust control to an internal combustion engine, the method comprising:
   receiving a thrust request;
   determining at least one of a throttle setpoint, a governor setpoint, or a RPM setpoint based on the thrust request;
   determining whether the thrust request violates an available thrust limit; and
   when the thrust request does not violate the available thrust limit, transmitting at least one of the throttle setpoint, the governor setpoint, or the RPM setpoint to an engine, and
   when the thrust request violates the available thrust limit, determining at least one of a modified throttle setpoint, a modified governor setpoint, or a modified RPM setpoint, and transmitting the at least one of the modified throttle setpoint, the modified governor setpoint, or the modified RPM setpoint to the engine.

2. The method of claim 1 wherein the available thrust limit is a maximum thrust limit.

3. The method of claim 1 wherein the available thrust limit is a minimum thrust limit.

4. The method of claim 1 comprising providing an engine and propeller performance look up table to serve as an engine performance data array.

5. The method of claim 1 comprising adjusting a blade angle of a propeller via a governor lever to meet the governor setpoint or the modified governor setpoint.

6. The method of claim 1 comprising adjusting a power output of the engine via a throttle lever to meet the throttle setpoint or the modified throttle setpoint.

7. The method of claim 1 comprising receiving a mode request and using the mode request to determine at least one of: (i) the modified throttle setpoint, (ii) the modified governor setpoint, and (iii) the modified RPM setpoint.

8. The method of claim 7 wherein the mode request is a selection between a first mode corresponding to a first RPM, a second mode corresponding to a second RPM, or a third mode corresponding to a third RPM.

9. The method of claim 8 comprising determining at least one of: (i) the modified throttle setpoint, (ii) the modified governor setpoint, and (iii) the modified RPM setpoint via an airspeed reading and an altitude reading.

10. The method of claim 1 comprising receiving the thrust request from at least one of a pilot or an autopilot.

11. A system for providing thrust control to an engine, comprising:
   a horizontal thrust unit (HTU) controller configured to control an amount of thrust produced by the engine, wherein the HTU controller is configured to receive a thrust request for an amount of desired thrust from a flight control computer, and the HTU controller determines whether the thrust request violates an available thrust limit;
   a throttle lever operatively coupled to the HTU controller; and
   a governor lever operatively coupled to the HTU controller, wherein the HTU controller adjusts the throttle lever and the governor lever based upon the thrust request when the thrust request does not violate the available thrust limit.

12. The system of claim 11 wherein the HTU controller uses a throttle setpoint for controlling the throttle lever, a governor setpoint for controlling the governor lever, and an RPM setpoint for controlling a propeller speed to meet the thrust request.

13. The system of claim 11 wherein the available thrust limit comprises a maximum amount of thrust the engine can produce.

14. The system of claim 11 wherein the available thrust limit comprises a minimum amount of thrust the engine can produce.

15. The system of claim 12 wherein when the throttle setpoint, the governor setpoint, and the RPM setpoint are within the available thrust limit, operation of the engine occurs at an optimal efficiency.

16. The system of claim 15 wherein when the throttle setpoint, the governor setpoint, and the RPM setpoint are not within the available thrust limit, a modified throttle setpoint, a modified governor setpoint, and a modified RPM setpoint are used by the HTU controller to meet the thrust request.

17. The system of claim 16 wherein when the modified throttle setpoint, the modified governor setpoint, and the modified RPM setpoint are settings of the throttle lever and governor lever, the engine does not operate at an optimal efficiency.

18. A method for providing thrust control to an internal combustion engine, the method comprising:
receiving information about an aircraft state of flight;
determining a mode request based on the aircraft state of flight;
determining an available thrust limit and at least one of a throttle setpoint, a governor setpoint, or a RPM setpoint based on the mode request;
determining whether any of the throttle setpoint, governor setpoint, or RPM setpoint violate the available thrust limit;
when any setpoint does not violate the available thrust limit, transmitting at least one of the throttle setpoint, the governor setpoint, or the RPM setpoint to an engine;
when any setpoint violates the available thrust limit, changing the mode request corresponding to a different available thrust limit such that the throttle setpoint, governor setpoint, and RPM setpoint do not violate the different available thrust limit; and
transmitting the at least one of the throttle setpoint, governor setpoint, RPM setpoint to the engine.

19. The method of claim 18 comprising determining the mode request based upon a thrust request.

20. The method of claim 18 wherein the mode request comprises a selection between a first mode having a first available thrust limit, a second mode having a second available thrust limit, and a third mode having a third available thrust limit.

* * * * *